US011033042B2

United States Patent
Cavallini-Gardner et al.

(10) Patent No.: US 11,033,042 B2
(45) Date of Patent: Jun. 15, 2021

(54) SPACE-CAPSULE BEAN ROASTING METHOD AND SYSTEM

(71) Applicants: Anders Isaac Cavallini-Gardner, San Diego, CA (US); Hatem Alaa Hussein, Dubai (AE)

(72) Inventors: Anders Isaac Cavallini-Gardner, San Diego, CA (US); Hatem Alaa Hussein, Dubai (AE)

( * ) Notice: Subject to any disclaimer, the term of this patent is extended or adjusted under 35 U.S.C. 154(b) by 324 days.

(21) Appl. No.: 16/257,614

(22) Filed: Jan. 25, 2019

(65) Prior Publication Data

US 2020/0000115 A1    Jan. 2, 2020

Related U.S. Application Data

(60) Provisional application No. 62/621,599, filed on Jan. 25, 2018.

(51) Int. Cl.
*A23F 5/04* (2006.01)
*A23G 1/00* (2006.01)
*B64G 1/62* (2006.01)
*B64G 1/58* (2006.01)

(52) U.S. Cl.
CPC .............. *A23F 5/04* (2013.01); *A23G 1/002* (2013.01); *B64G 1/58* (2013.01); *B64G 1/62* (2013.01)

(58) Field of Classification Search
CPC .. A23F 5/04; A23G 1/002; B64G 1/58; B64G 1/62
See application file for complete search history.

(56) References Cited

U.S. PATENT DOCUMENTS

| | | | | |
|---|---|---|---|---|
| 5,274,736 A | * | 12/1993 | Rohr, Jr. | A47J 31/005 219/437 |
| 7,213,505 B2 | * | 5/2007 | Kollep | A47J 31/005 99/281 |
| 2008/0023306 A1 | * | 1/2008 | Jodoin | G04G 15/006 200/35 R |

FOREIGN PATENT DOCUMENTS

CN     204811683    * 12/2015

OTHER PUBLICATIONS

Derwent Abstract for CN204811683 published Dec. 2015.*

* cited by examiner

*Primary Examiner* — Anthony J Weier

(57) ABSTRACT

In one aspect, with a sounding rocket, a space-capsule bean roasting system is placed into a sub-orbital flight path. The space-capsule bean roasting system includes a re-entry capsule. The re-entry capsule includes a bean roasting system and a payload of raw beans. The re-entry capsule re-enters the Earth's atmosphere at a specific trajectory. The re-entry heat is transferred to the bean roasting system. The payload of raw beans is roasted with the re-entry heat.

10 Claims, 4 Drawing Sheets

100

SPACE-CAPSULE BEAN ROASTING METHOD AND SYSTEM

CROSS-REFERENCE TO RELATED APPLICATIONS

This application is a claims priority from U.S. Provisional Patent Application No. 62/621,599, filed on 25 Jan. 2018 and titled SPACE-CAPSULE BEAN ROASTING METHOD AND SYSTEM. This application is hereby incorporated by reference in its entirety.

FIELD OF THE INVENTION

The invention is in the field of coffee roasters and more specifically to a method, system and apparatus of space-capsule bean roasting.

DESCRIPTION OF THE RELATED ART

Roasting coffee transforms the chemical and physical properties of green coffee beans into roasted coffee products. The roasting process is what produces the characteristic flavor of coffee by causing the green coffee beans to change in taste. The environment can significantly affect the roasting process. Space offers a unique environment with its lower gravity and lower air pressure. The friction between a capsule and the atmosphere provides heat source. Accordingly, improvements to space-capsule bean roasting are desired.

BRIEF SUMMARY OF THE INVENTION

In one aspect, with a sounding rocket, a space-capsule bean roasting system is placed into a sub-orbital flight path. The space-capsule bean roasting system includes a re-entry capsule. The re-entry capsule comprises a bean roasting system and a payload of raw beans. The re-entry capsule re-enters the Earth's atmosphere at a specific trajectory. The re-entry heat is transferred to the bean roasting system. The payload of raw beans is roasted with the re-entry heat.

Figure 1:
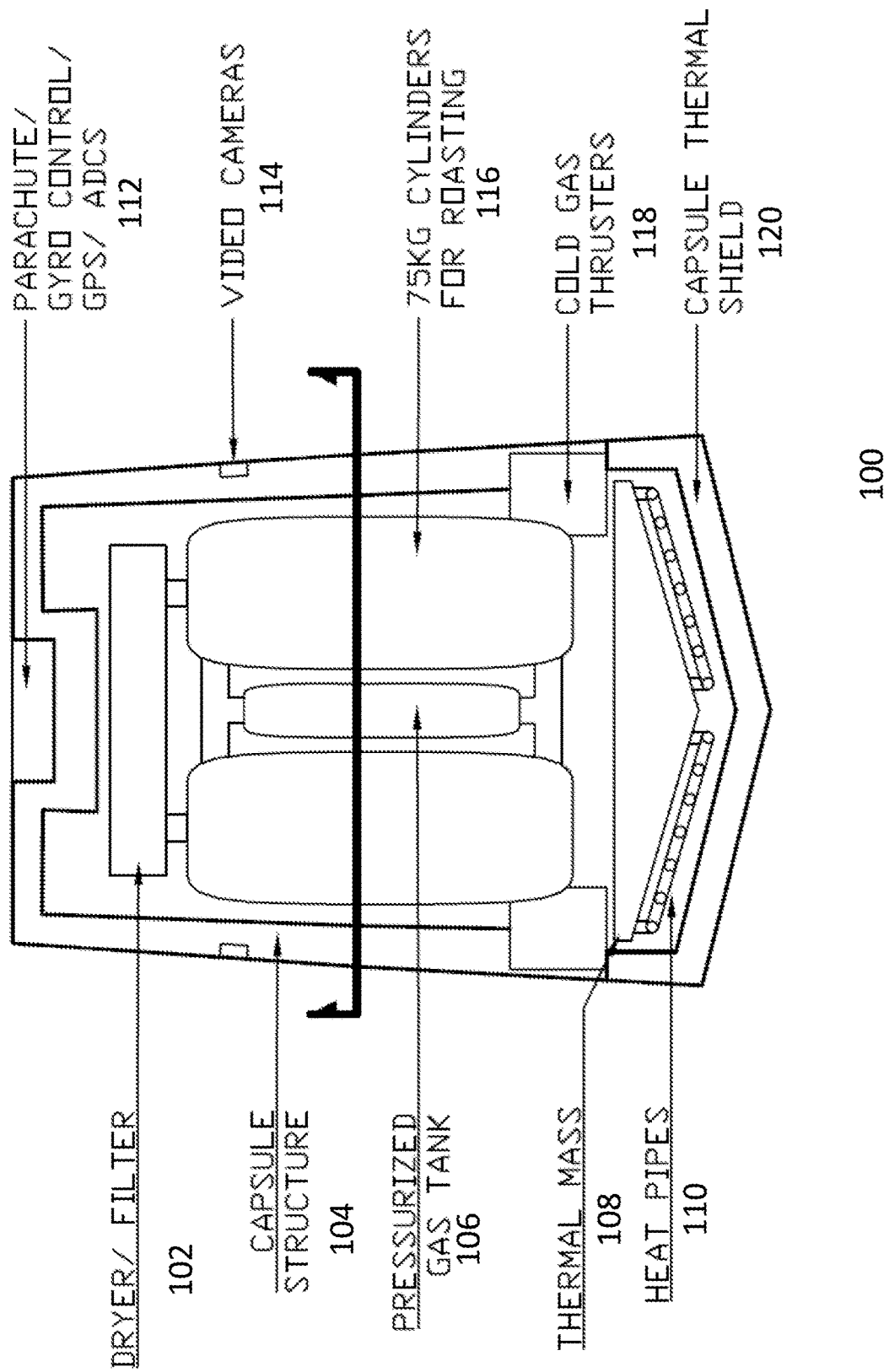
FIG. 1 illustrates an example cross section view of a space-capsule bean roasting system, according to some embodiment.

The Figures described above are a representative set, and are not an exhaustive with respect to embodying the invention.

DESCRIPTION

Disclosed are a system, method, and article of manufacture for a space-capsule bean roasting system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Air data computer (ADC) is an avionics component found in modern glass cockpits. The ADC can determine the calibrated airspeed, Mach number, altitude, and altitude trend data from a pitot-static system.

Heat pipe is a heat-transfer device that combines the principles of both thermal conductivity and phase transition to effectively transfer heat between two solid interfaces. At the hot interface of a heat pipe a liquid in contact with a thermally conductive solid surface turns into a vapor by absorbing heat from that surface. The vapor then travels along the heat pipe to the cold interface and condenses back into a liquid—releasing the latent heat. The liquid then returns to the hot interface through either capillary action, centrifugal force, or gravity, and the cycle repeats.

Reinforced carbon-carbon (RCC) is a composite material consisting of carbon fiber reinforcement in a matrix of graphite.

Sounding rocket can be a rocket designed to take measurements and perform scientific experiments during a sub-orbital flight (e.g. between 40 kilometers (25 mi) and approximately 120 kilometers (75 mi), between 200 km to 600 km, etc.).

Thermal mass can be an object that stores heat.

Example Systems

A space-capsule bean roasting system is provided. Space-capsule bean roasting system can be launched into space using a rocket system. Space-capsule bean roasting system can include a payload of raw beans (e.g. coffee beans, cocoa beans, etc.). Space-capsule bean roasting system can transfer heat from atmospheric drag and aerodynamic heating into a bean heating system with the space capsule. The size and dimensions of the space-capsule bean roasting system can vary depending on such factors as, inter alia: type of rocket launching systems, bean payload, etc. Example embodiments of a space-capsule bean roasting system are now discussed.

In some example embodiments, a space-capsule bean roasting system can be a two meter (2 m) in diameter by one and a half (1.5 m) in height capsule. It is noted that this size is provided by way of example and not of limitation. Space-capsule bean roasting system include four canisters. Each canister can hold a payload of approximately seventy-five kilograms (75 kg) of raw/'green' coffee beans. A sounding rocket can be used to launch and place Space-capsule bean roasting system into a sub-orbital flight path. The sounding rocket can release Space-capsule bean roasting system to re-entry the Earth's atmosphere at a specific trajectory and/or other specified re-entry parameters (e.g. re-entry angle, speed, target landing location, etc.). Re-entry can cause heat (e.g. from atmospheric drag and aerodynamic heating) on Space-capsule bean roasting system. Space-capsule bean roasting system can include a heat shield system to protect it from atmospheric re-entry heat.

As shown, space-capsule bean roasting system can include heat pipes. The heat pipes can conduct a portion of the re-entry heat to a bean-roasting system in space-capsule bean roasting system. For example, the heat pipes can conduct the heat through space-capsule bean roasting system and be stored on a thermal mass. A canister of air with a specified volume can then be heated by the thermal mass. Once the air is heated to a specified temperature, it can be channeled through the beans for a specified period of time. The upper portion of space-capsule bean roasting system can include a capsule recovery system (e.g. drogue parachute, parachute, etc.). A dryer/filter system can remove said water particles and coffee bean husks and/or other particulate contaminants.

Space-capsule bean roasting system can include volumes and other systems for attitude control (e.g. cold-gas thrusters for orientation to ground or nadir). Space-capsule bean roasting system can include a thermal mass for storing heat from heat pipes. This heat can be obtained from re-entry. Heat pipes can obtain heat from ceramic heat tiles in the heat shield. Depending on the heat profile of re-entry, various types of ceramic heat tiles can be utilized. This can depend on various flight-path parameters. In one example, the ceramic tiles can be composed of RCC-based materials. The structure of space-capsule bean roasting system can be made of aluminum beams, skin and the like.

Example re-entry speeds can be approximately Mach six to eight (6-8 Ma).

Space-capsule bean roasting system can include a heat pipe coil system that transfers heat to the thermal mass located above it. Additionally, rotating augers inside the coffee bean roasting canisters are shown. In this way, coffee beans can be rotated for a more uniform roasting profile. Beans can float in the microgravity environment of space and stirred into motion by the auger. The auger can be a zinc-based metallic material. In another example, an airflow system can also be used to move beans in the roasting canisters. Space-capsule bean roasting system can include additional attitude thrusters are also shown along with heat pipes.

In one example, space-capsule bean roasting system can include a frame structure of a space-capsule bean roasting system. Frame structure illustrate an example shape of a two-meter (2 m) diameter and one-point-five meter (1.5 m) tall space-capsule bean roasting system. Frame structure includes a taper in angle. This angle can be varied. The angle can be between five and fifteen degrees in some example embodiments.

Space-capsule bean roasting system can include a thermal control system for a space-capsule bean roasting system, according to some embodiments. Thermal control system can utilize re-entry heat as a heat source. Heat pipes can gather the heat to a thermal mass. Heat sinks can be used to transfer heat in one example. In another example, the air canister and associated pipes can attach to the thermal mass in a coiled form. As fluid runs through pipes, the heat can be conducted from thermal pipes into the air in the air canister. Depending on a flow rate needed, the number of coils can be used to set the flow rate used to heat the air with the thermal mass.

It is noted that a bean-roasting system can have four cylinders that hold 75 kg of beans in one example. Red arrows show heated air (as heated by the thermal mass) and blue arrows show exiting cooler air exiting an air canister in the center of space-capsule bean roasting system. Bean-roasting system include control valves, thermal couples, filtering system(s), drying system(s), etc. These can be used to regulated temperature, humidity and/or pressure in the cylinders where the roasting occurs. Air canister can include the amount of air to be utilized for the bean-roasting process. In some embodiments, this air can be used for later cooling of beans as well. During the roasting process, a continuous flow of air can be provided to the cylinders.

Space-capsule bean roasting system can include a bus system for a space-capsule bean roasting system, according to some embodiments. Bus system can provide support of bean-roasting system. Bus system can include thrusters, parachutes, digital video cameras, computing devices, drivers, networking systems, landing airbags, beacon systems, GPS, guidance/navigation systems, etc.

In some example embodiments, the main canister(s) can include augers. This can form the roasting oven. The scale of the components can be varied in other example embodiments. The oven environment can be physically isolated in a protected environment from the electronic components of space-capsule bean roasting system.

FIG. 1 illustrates an example cross section view of a space-capsule bean roasting system 100, according to some embodiment. Space-capsule bean roasting system 100 can include dryer/filter system 102. Water particles can be a byproduct of roasting green coffee beans. Dryer/filter system 102 can remove said water particles and coffee bean husks and/or other particulate contaminants. Space-capsule bean roasting system can include tubes for recirculating air from dryer/filter system 102 back into the bean roasting system.

Space-capsule bean roasting system 100 can include capsule structure 104. As noted supra, in one example, capsule structure 104 can be a two meter (2 m) in diameter by one and a half (1.5 m) in height capsule.

Space-capsule bean roasting system 100 can include pressurized gas tank(s) 106. Thermal mass 108 can store the heat conducted by heat pipes 110 through space-capsule bean roasting system. Space-capsule bean roasting system 100 can include other components such as parachutes, ADCs, gyro control, global positioning system, other navigation systems, etc. 112. Space-capsule bean roasting system 100 can include video cameras 114.

Space-capsule bean roasting system 100 can include cylinders for coffee bean roasting 116. In one example, cylinders for coffee bean roasting 116 can be seventy-five kilogram (75 kg) cylinders. Space-capsule bean roasting system 100 can include cold-gas thrusters 118. Cold-gas thrusters 118 can be used for orientation to ground or nadir. Capsule thermal shield 120 can be a heat shield system to protect it from atmospheric re-entry heat.

Figure 2:
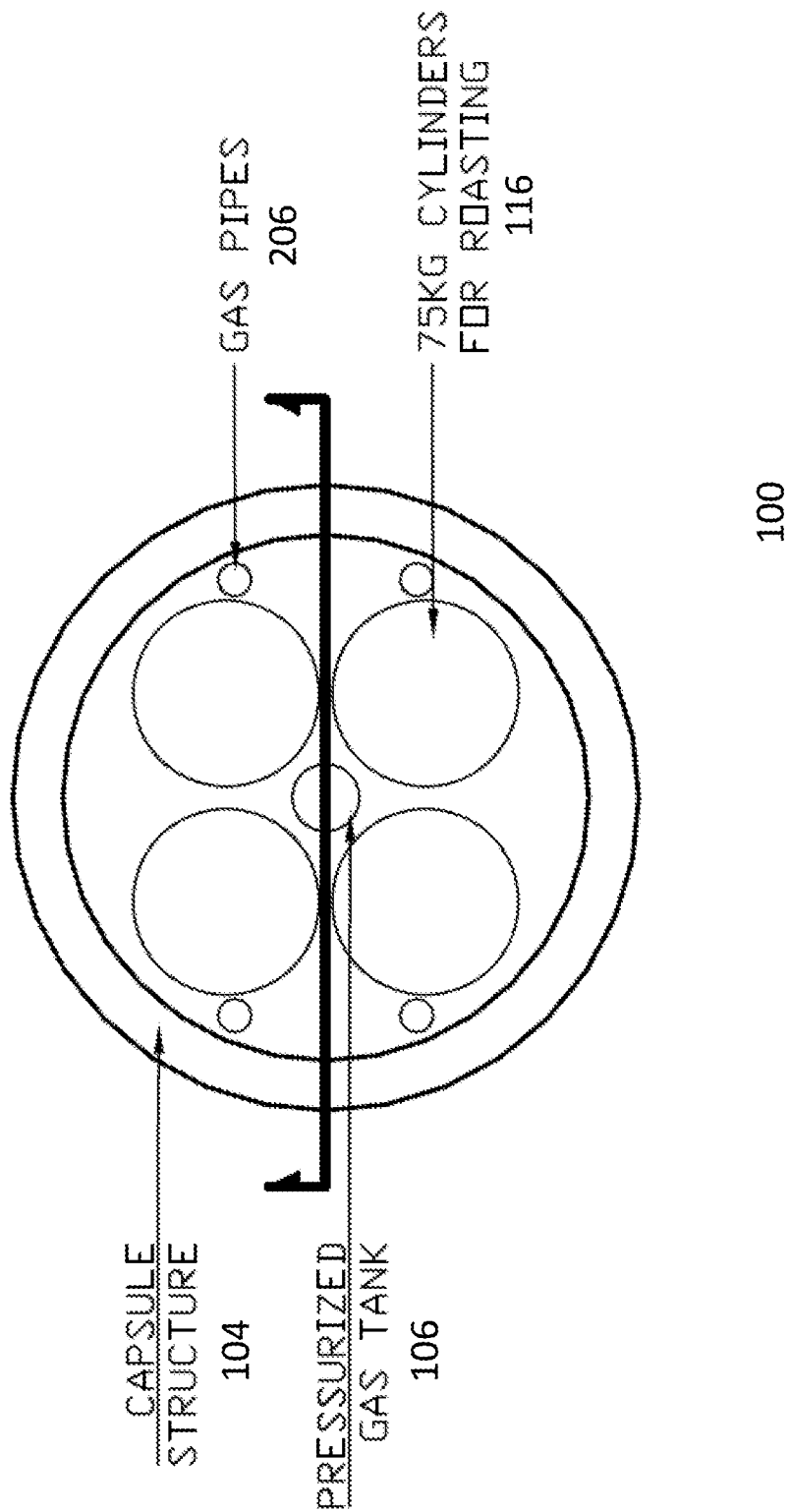
FIG. 2 illustrates a bottom view of space-capsule bean roasting system, according to some embodiments.

FIG. 2 illustrates a bottom view of space-capsule bean roasting system 100, according to some embodiments. FIG. 2 illustrates the location and orientation of capsule structure 104, pressurized gas tank(s) 106, gas pipes 206, and cylinders for coffee bean roasting 116 within space-capsule bean roasting system 100.

Example Methods

Figure 3:
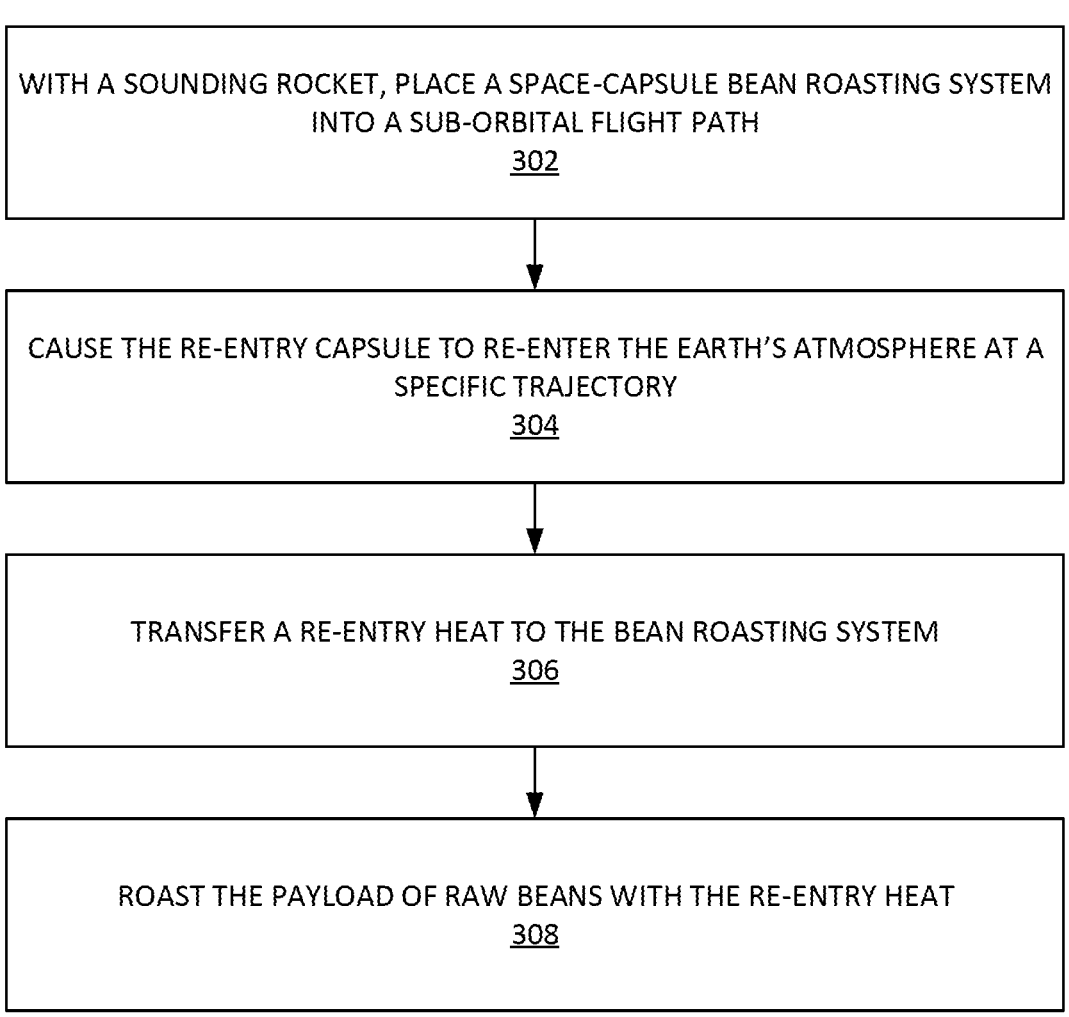
FIG. 3 illustrates an example process for roasting coffee, according to some embodiments.

FIG. 3 illustrates an example process 300 for roasting coffee, according to some embodiments. In step 302, process 300 can, with a sounding rocket, place a space-capsule bean roasting system into a sub-orbital flight path. The space-capsule bean roasting system includes a re-entry capsule. The re-entry capsule comprises a bean roasting system and a payload of raw beans. In step 304, process 300 causes the re-entry capsule to re-enter the Earth's atmosphere at a specific trajectory. In step 306, process 300 transfers a re-entry heat to the bean roasting system. In step 308, process 300 roasts the payload of raw beans with the re-entry heat.

Additional Computer Architecture

Figure 4:
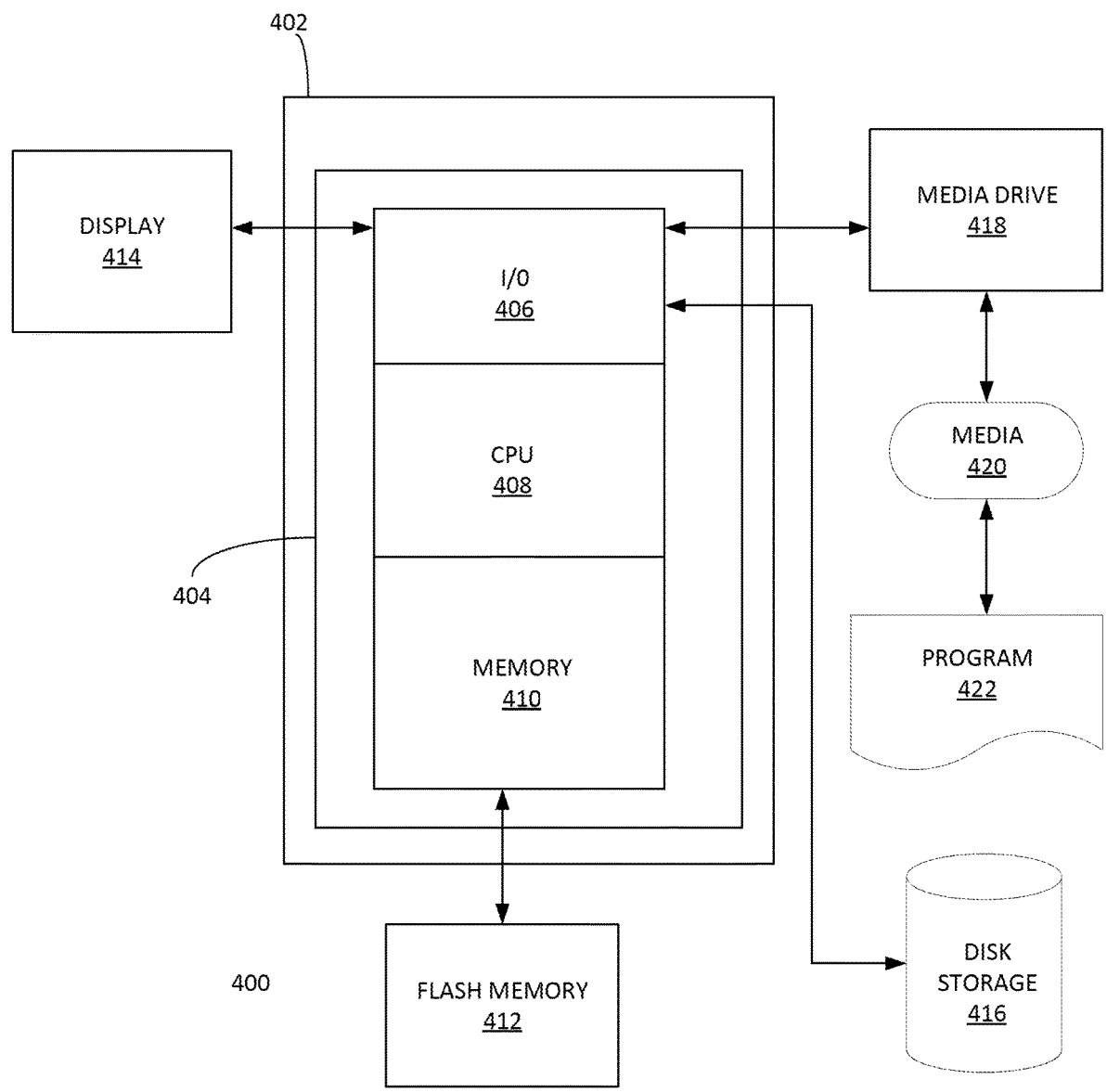
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for roasting coffee comprising:
   with a sounding rocket, placing a space-capsule bean roasting system into a sub-orbital flight path, wherein the space-capsule bean roasting system includes a re-entry capsule, and wherein the re-entry capsule comprises a bean roasting system and a payload of raw beans;
   causing the re-entry capsule to re-enter the Earth's atmosphere at a specific trajectory;
   transferring a re-entry heat to the bean roasting system; and
   roasting the payload of raw beans with the re-entry heat.

2. The method of claim 1, wherein the raw beans are raw coffee beans.

3. The method of claim 1, wherein the raw beans are raw cacao beans.

4. The method of claim 1, wherein the step of transferring a re-entry heat to the bean roasting system further comprises:
   with one or more heat pipes in the re-entry capsule, conducting a specified portion of the re-entry heat to a thermal mass in the re-entry capsule.

5. The method of claim 4, wherein the step of roasting the payload of raw beans further comprises:
   coupling a canister of air with a specified volume, and heating the canister of air with the thermal mass.

6. The method of claim 5, wherein the step of roasting the raw beans further comprises:
   once the air canister of air is heated to a specified temperature, channeling the air through the raw beans for a specified period of time.

7. The method of claim 6, wherein the one or more heat pipes obtain heat from a set of ceramic heat tiles in a heat shield of the re-entry capsule.

8. The method of claim 7, wherein the raw beans are stored in a roasting oven in the re-entry capsule.

9. The method of claim 8, wherein the roasting oven comprises an auger.

10. The method of claim 9, wherein the roasting oven is physically isolated from a set of electric components of the re-entry capsule.

* * * * *